United States Patent
Yamine et al.

(10) Patent No.: US 11,653,241 B2
(45) Date of Patent: May 16, 2023

(54) REPORTING PERFORMANCE DEGRADATION IN A COMMUNICATIONS SYSTEM

(71) Applicant: Telefonaktiebolaget LM Ericsson (publ), Stockholm (SE)

(72) Inventors: Badawi Yamine, Beirut (LB); Iana Siomina, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/056,856

(22) PCT Filed: Jun. 1, 2018

(86) PCT No.: PCT/EP2018/064410
§ 371 (c)(1),
(2) Date: Nov. 19, 2020

(87) PCT Pub. No.: WO2019/228637
PCT Pub. Date: Dec. 5, 2019

(65) Prior Publication Data
US 2021/0153051 A1  May 20, 2021

(51) Int. Cl.
H04W 24/10 (2009.01)
H04W 76/27 (2018.01)
(Continued)

(52) U.S. Cl.
CPC .......... *H04W 24/10* (2013.01); *H04W 24/08* (2013.01); *H04W 76/27* (2018.02); *H04W 84/042* (2013.01)

(58) Field of Classification Search
CPC ..... H04W 24/10; H04W 24/08; H04W 76/27; H04W 84/042
(Continued)

(56) References Cited

U.S. PATENT DOCUMENTS 9,609,538 B2 * 3/2017 Kim ................ H04W 24/10
2014/0024331 A1 * 1/2014 Hsu ................. H04W 4/90
455/404.1
(Continued)

FOREIGN PATENT DOCUMENTS

CN     103856980 A    6/2014
EP      2763454 A1    8/2014
(Continued)

OTHER PUBLICATIONS

3GPP, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT);", 3GPP TS 37.320 V13.1.0, Mar. 2016, pp. 1-26.
(Continued)

*Primary Examiner* — Mong-Thuy T Tran
(74) *Attorney, Agent, or Firm* — Murphy, Bilak & Homiller, PLLC

(57) ABSTRACT

There is provided mechanisms for reporting performance degradation in a communications system. The method is performed by a wireless device in idle mode. The method comprises detecting occurrence of performance degradation with a first radio access network node. The method comprises reporting the performance degradation as an event to a second radio access network node. The first radio access network node and the second radio access network node operate using mutually different radio access technologies and/or serve mutually different public land mobile networks.

25 Claims, 6 Drawing Sheets

(51) Int. Cl.
 *H04W 24/08* (2009.01)
 *H04W 84/04* (2009.01)
(58) Field of Classification Search
 USPC .......................................................... 370/329
 See application file for complete search history.

(56) References Cited

U.S. PATENT DOCUMENTS

| | | | | |
|---|---|---|---|---|
| 2014/0128057 | A1* | 5/2014 | Siomina ................ | H04W 56/00 455/423 |
| 2014/0146732 | A1* | 5/2014 | Olufunmilola ... | H04W 52/0212 370/311 |
| 2014/0295840 | A1* | 10/2014 | Keskitalo ............. | H04W 24/10 455/436 |
| 2014/0370914 | A1* | 12/2014 | Jung ....................... | H04W 4/02 455/456.1 |
| 2015/0044972 | A1* | 2/2015 | Lee ....................... | H04W 24/10 455/67.11 |
| 2015/0126205 | A1* | 5/2015 | Kim .................... | H04W 74/002 455/450 |
| 2017/0142566 | A1* | 5/2017 | Lin ........................ | H04W 4/90 |
| 2017/0347279 | A1* | 11/2017 | Bejerano ............... | H04W 24/02 |

FOREIGN PATENT DOCUMENTS

| | | | | |
|---|---|---|---|---|
| EP | 3399788 | A1 | 11/2018 | |
| TW | 201717689 | A * | 5/2017 | ............ H04W 36/08 |
| WO | WO-2013023506 | A1 * | 2/2013 | ............ H04W 24/10 |
| WO | WO-2013047835 | A1 * | 4/2013 | ............ H04W 24/10 |
| WO | 2014180714 | A1 | 11/2014 | |

OTHER PUBLICATIONS

3GPP, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT);", 3GPP TS 37.320 V14.0.0, Mar. 2017, 1-26.

3GPP, "3GPP TS 36.331 V15.1.0", 3rd Generation Partnership Project; Technical Specification Group Radio Access Network; Evolved Universal Terrestrial Radio Access (E-UTRA); Radio Resource Control (RRC); Protocol specification (Release 15), Mar. 2018, 1-786.

Huawei, et al., "The MDT applicability of EPLMN", 3GPP TSG-WG2 Meeting #75, R2-114011, Athens, Greece, Aug. 22-26, 2011, 1-16.

Samsung, "Introducing REL-11 MDT enhancements in 36.311", 3GPP TSG-RAN2#78 meeting, Tdoc R2-122616, Prague, Czech Republic, May 21-25, 2012, 1-4.

* cited by examiner

REPORTING PERFORMANCE DEGRADATION IN A COMMUNICATIONS SYSTEM

TECHNICAL FIELD

Embodiments presented herein relate to a method, a wireless device, a computer program, and a computer program product for reporting performance degradation in a communications system. Embodiments presented herein further relate to a method, a radio access network node, a computer program, and a computer program product for obtaining reporting of performance degradation in a communications system.

BACKGROUND

In communications systems, there could be a challenge to obtain good performance and capacity for a given communications protocol, its parameters and the physical environment in which the communications systems are deployed.

For example, one parameter in providing good performance and capacity for a given communications protocol in a communications system is the ability for the communications system itself to be enabled to detect problems and automatically solve them without human intervention.

Further, low latency could be required in applications such as unmanned or autonomous ground vehicles (also referred to as autonomous cars, driverless cars, self-driving cars, and robotic cars, and denoted ground vehicle for short), remotely controlled unmanned aerial vehicles (UAV for short and commonly referred to as drones), and remote surgery, to only mention a few examples.

Some current telecommunications standards allows wireless devices served in the communications system to in real time report events of performance degradation occurring in the communications system, but then only when the wireless devices are in connected mode. Thus, when in idle mode the wireless devices do not report events of performance degradation in real time.

Wireless devices in idle mode might instead log any encountered events pertaining to performance degradation and then report the event later during its next connection to the network, i.e., when in connected mode. Moreover, even though the wireless devices in idle mode could report the event in non-real time, this reporting has to be made using the same Radio Access Technology (RAT) and in the same Public Land Mobile Network (PLMN) as where the performance degradation occurred. In other words, if a wireless device encounters a performance degradation on a first cell of a first RAT and first PLMN, then if the wireless device moves to a second cell of a second RAT and/or a second PLMN, the wireless device cannot report the event to the second cell.

Hence, there is a need for an improved reporting of performance degradation in a communications system

SUMMARY

An object of embodiments herein is to enable efficient reporting of performance degradation in a communications system.

According to a first aspect there is presented a method for reporting performance degradation in a communications system. The method is performed by a wireless device in idle mode. The method comprises detecting occurrence of performance degradation with a first radio access network node. The method comprises reporting the performance degradation as an event to a second radio access network node. The first radio access network node and the second radio access network node operate using mutually different radio access technologies and/or serve mutually different public land mobile networks.

According to a second aspect there is presented a wireless device for reporting performance degradation in a communications system. The wireless device comprises processing circuitry. The processing circuitry is configured to cause the wireless device to, in idle mode detect occurrence of performance degradation with a first radio access network node. The processing circuitry is configured to cause the wireless device to, in idle mode report the performance degradation as an event to a second radio access network node. The first radio access network node and the second radio access network node operate using mutually different radio access technologies and/or serve mutually different public land mobile networks.

According to a third aspect there is presented a wireless device for reporting performance degradation in a communications system. The wireless device comprises a detect module configured to, when the wireless is in idle mode, detect occurrence of performance degradation with a first radio access network node. The wireless device comprise a report module configured to, when the wireless is in idle mode, report the performance degradation as an event to a second radio access network node. The first radio access network node and the second radio access network node operate using mutually different radio access technologies and/or serve mutually different public land mobile networks.

According to a fourth aspect there is presented a computer program for reporting performance degradation in a communications system. The computer program comprises computer program code which, when run on processing circuitry of a wireless device, causes the wireless device to, in idle mode, perform a method according to the first aspect.

According to a fifth aspect there is presented a method for obtaining reporting of performance degradation in a communications system. The method is performed by a radio access network node. The method comprises obtaining reporting of an event from a wireless device in idle mode. The event has been detected by the wireless device and pertains to a performance degradation of the wireless device with another radio access network node. The radio access network node and the so-called another radio access network node operate using mutually different radio access technologies and/or serve mutually different public land mobile networks.

According to a sixth aspect there is presented a radio access network node for obtaining reporting of performance degradation in a communications system. The radio access network node comprises processing circuitry. The processing circuitry is configured to cause the radio access network node to obtain reporting of an event from a wireless device in idle mode. The event has been detected by the wireless device and pertains to a performance degradation of the wireless device with another radio access network node. The radio access network node and the so-called another radio access network node operate using mutually different radio access technologies and/or serve mutually different public land mobile networks.

According to a seventh aspect there is presented a radio access network node for obtaining reporting of performance degradation in a communications system. The radio access network node comprises an obtain module configured to obtain reporting of an event from a wireless device in idle mode. The event has been detected by the wireless device and pertains to a performance degradation of the wireless device with another radio access network node. The radio access network node and the so-called another radio access network node operate using mutually different radio access technologies and/or serve mutually different public land mobile networks.

According to an eight aspect there is presented a computer program for obtaining reporting of performance degradation in a communications system, the computer program comprising computer program code which, when run on processing circuitry of a radio access network node, causes the radio access network node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these wireless devices, these radio access network nodes, and these computer programs provide efficient reporting of performance degradation in a communications system.

Advantageously these methods, these wireless devices, these radio access network nodes, and these computer programs enable performance degradation that occur on one cell (as defined by the first radio access network node), belonging to one RAT and one PLMN to be reported to another cell (as defined by the second radio access network node) that belongs to another RAT and/or another PLMN.

Advantageously these methods, these wireless devices, these radio access network nodes, and these computer programs avoid any wireless device to be trapped between two problematic neighbouring cells that belong to different RATs or PLMNs.

Advantageously, this is particularly advantageous in case the trapped call is an emergency call or serves latency-sensitive application call that requires high reliability.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
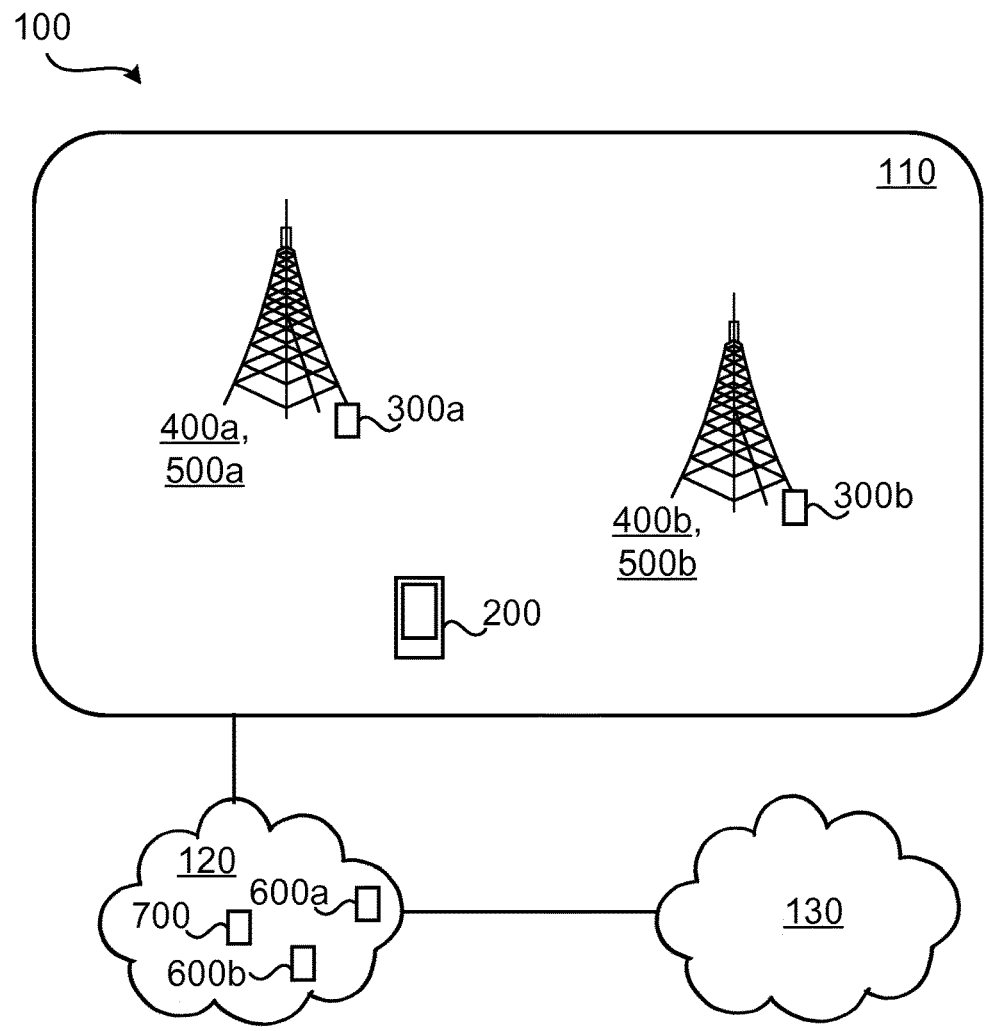
FIGS. 1, 4, and 5 are schematic diagrams illustrating a communications systems according to embodiments.

FIG. 1 is a schematic diagram illustrating a communications system 100 where embodiments presented herein can be applied. The communications system 100 comprises a radio access network 110 in which radio access network nodes 300a, 300b provide network access in cells, a core network 120, and a service network 130. The radio access network 110 is operatively connected to the core network 120 which in turn is operatively connected to the service network 130. The radio access network nodes 300a, 300b thereby enables wireless devices 200 to access services and exchange data as provided by the service network 130.

Examples of wireless devices 200 include, but are not limited to, mobile stations, mobile phones, handsets, wireless local loop phones, user equipment (UE), smartphones, laptop computers, tablet computers, sensors, actuators, modems, repeaters, network-equipped Internet of Things devices, and network-equipped vehicles. Each radio access network node 300a, 300b is associated with a radio access technology (RAT) 400a, 400b and a public land mobile network (PLMN) 500a, 500b. Examples of radio access network nodes 300a, 300b include, but are not limited to, radio base stations, base transceiver stations, NodeBs, evolved NodeBs, gNBs, and access points. As the skilled person understands, the communications system 100 may comprise a plurality of radio access network nodes 300a, 300b, each providing network access to a plurality of wireless devices 200. The herein disclosed embodiments are not limited to any particular number of radio access network nodes 300a, 300b or wireless devices 200.

Operations support systems (OSS) 600a, 600b (one for each PLMN 500a, 500b or for each RAT 400a, 400b) are provided in the core network 120. In general terms, the OSSs 600a, 600b support management functions, such as network inventory, service provisioning, network configuration, monitoring of events and key performance indicators (KPI), and fault management, in the communications system 100. The OSSs 600a, 600b are operatively connected to a network server 700. Other properties of the OSSs 600a, 600b as well as of the network server 700 relevant for the embodiments disclosed herein will be described below.

Some issues with traditional reporting of events pertaining to network performance degradations have been disclosed above. Additional aspects relating thereto will now be disclosed.

The radio access network nodes 300a, 300b could typically report events to the OSSs 600a, 600b on regular time intervals, such as every 15 minutes in order to minimize signalling in the communications system. Hence, the OSSs 600a, 600b might have to wait for 15 minutes in order to receive reports of events from the radio access network nodes 300a, 300b in order to detect and at least try to solve the issue by means of auto-healing. But waiting for 15 minutes not only will be a long period but also by observing the reports alone during low traffic periods might not lead to a detection that there is an issue. For example, in periods of low traffic the OSSs 600a, 600b might not detect call setup failures since the OSSs 600a, 600b suspect the number of successful calls to be low. It might thus not be until periods of high traffic that the OSSs 600a, 600b detect that the number of successful calls is suspected to be too low, thereby detecting the issue in the network.

It could further be assumed that there are occasions where the wireless device 200 experiences an issue that causes an event to be generated, without the network-side, such as any of the OSSs 600a, 600b or even the radio access network nodes 300a, 300b being aware of such issues. An example is when the wireless device 200 experiences consecutive call setup failures even though the radio conditions radio coverage and radio link quality are good. Such call setup failures could be due to issues in the network. For example, there could be a high level of uplink interference or hardware/software issues at the radio access network nodes 300a, 300b, etc. That is, in some scenarios the network-side is unaware about issues in the network, such as call setup failures as experienced by the wireless device 200 at the user-side. Thus even though there might be auto-healing implemented on the radio access network nodes 300a, 300b and on the OSSs 600a, 600b, no action will be taken from the network-side in order to solve the issue causing the event. One way could be for the subscriber of the wireless device 200 that experiences the issue causing the event to call an operator customer service centre to manually notify about the call failures. But there is no guarantee that the subscriber will notify the operator customer service centre about the call failures. Even in a case where such a notification is made the time interval between occurrence of the issue causing the event (and thus causing the event to be reported) and technical staff detecting and solving the issue might be long.

In addition, in order to provide high call reliability, some current telecommunications standards might allow a multi-RAT connection, where the wireless device 200 could have simultaneously a connection with two or more different RATs. Assume that the wireless device 200 has simultaneously a connection with a first radio access network node 300a and a second radio access network node 300b. Assume further that the wireless device 200 detects a performance degradation with the first radio access network node 300a. The following four scenarios are then possible.

Scenario 1: The first radio access network node 300a and the second radio access network node 300b use one and the same RAT and belong to one and the same PLMN.

Scenario 2: The first radio access network node 300a and the second radio access network node 300b use mutually different RATs but belong to one and the same PLMN.

Scenario 3: The first radio access network node 300a and the second radio access network node 300b one and the same RAT but belong to mutually different PLMNs.

Scenario 4: The first radio access network node 300a and the second radio access network node 300b use mutually different RATs and belong to mutually different PLMNs.

According to current mechanisms for reporting events the wireless device 200 would be enabled and allowed to report the performance degradation only in scenario 1. Hence, if the first radio access network node 300a and the second radio access network node 300b use mutually different RATs and/or belong to mutually different PLMNs the performance degradation will not be reported, which, in turn, could impact the overall performance of the communications system 100.

The embodiments disclosed herein therefore relate to mechanisms for reporting performance degradation in a communications system 100, 100a, 100b and for obtaining reporting of performance degradation in a communications system 100, 100a, 100b. In order to obtain such mechanisms there is provided a wireless device 200, a method performed by the wireless device 200, a computer program product comprising code, for example in the form of a computer program, that when run on processing circuitry of the wireless device 200, causes the wireless device 200 to perform the method. In order to obtain such mechanisms there is further provided a radio access network node 300b, a method performed by the radio access network node 300b, and a computer program product comprising code, for example in the form of a computer program, that when run on processing circuitry of the radio access network node 300b, causes the radio access network node 300b to perform the method.

Figure 2:
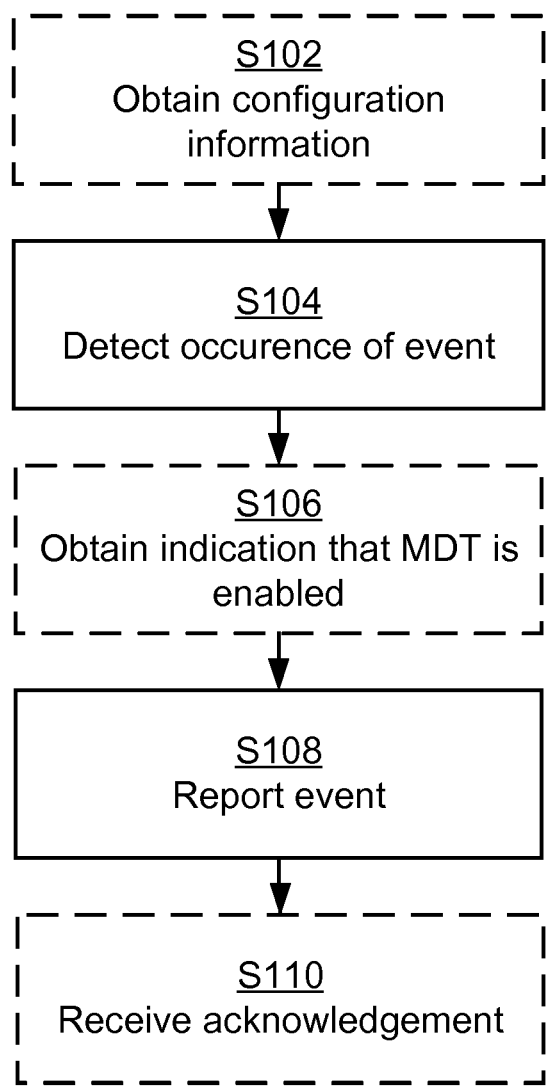
FIGS. 2 and 3 are flowcharts of methods according to embodiments.

Reference is now made to FIG. 2 illustrating a method for reporting performance degradation in a communications system 100, 100a, 100b as performed by the wireless device 200 in idle mode according to an embodiment. It is assumed that the wireless device 200 detects some kind of performance degradation with a first radio access network node 300a. Hence, the wireless device 200 is configured to perform step S104:

S104: The wireless device 200 detects occurrence of performance degradation with a first radio access network node 300a. Examples of performance degradation will be provided below.

The performance degradation is by the wireless device 200 reported as an event. Particularly, the wireless device 200 is configured to perform step S108:

S108: The wireless device 200 reports the performance degradation as an event to a second radio access network node 300b. Examples of different ways in which the event might be reported will be provided below.

The first radio access network node 300a and the second radio access network node 300b operate using mutually different radio access technologies 400a, 400b and/or serve mutually different public land mobile networks 500a, 500b.

Embodiments relating to further details of reporting performance degradation in a communications system 100, 100a, 100b as performed by the wireless device 200 will now be disclosed.

There could be different ways for the wireless device 200 to report the event to the second radio access network node 300b. Different embodiments relating thereto will now be described in turn.

In some aspects, minimization of drive test (MDT) is enabled in the second radio access network node 300b.

Particularly, according to an embodiment the event is reported in a report of MDT measurements.

The wireless device 200 might receive an indication that MDT is enabled before the wireless device 200 reports the event in a report of MDT measurements. Particularly, according to an embodiment the wireless device 200 is configured to perform (optional) step S106:

S106: The wireless device 200 obtains an indication that reporting of MDT measurements is enabled for the second radio access network node 300b. The indication is obtained before the wireless device 200 reports the event.

When the event is reported in a report of MDT measurements the reporting of the event might be delayed until a call connection is established with the second radio access network node 300b.

The event might be stored locally in the wireless device 200 at least until the call connection is established and the event has been reported.

In some aspects, the event is reported using radio resource control signalling. Particularly, according to an embodiment the event is reported in a radio resource control connection request message in a radio resource control connection procedure.

The event might have its own establishment cause. Particularly, according to an embodiment the radio resource control connection request message has a dedicated establishment cause. This establishment cause might be dedicated for real time reporting of performance degradation.

There could be additional content in the radio resource control connection request message other than the event itself. According to a non-limiting example the radio resource control connection request message comprises: cell identity of the first radio access network node 300a, identity of radio access technology 400a of the first radio access network node 300a, and/or identity of public land mobile network 500a of the first radio access network node 300a.

There could be other radio resource control messages, in addition to radio resource control connection request message, that the event is reported in. Particularly, the event might be reported in a radio resource control connection reestablishment message in a radio resource control connection procedure.

When the event is reported in a radio resource control connection establishment message or reestablishment message the wireless device 200 might receive a response from the second radio access network node 300b as an acknowledgement of reception of the reported event. Particularly, according to an embodiment the wireless device 200 is configured to perform (optional) step S110:

S110: The wireless device 200 receives an acknowledgement message from the second radio access network node 300b in response to having reported the event. The acknowledgement message terminates the radio resource control connection request procedure. In this respect, the acknowledgement message terminates only the radio resource control connection request procedure, whereas for call reestablishment after acknowledgment the signalling procedure continues up till the call is established.

The use of radio resource control messages allows for real time reporting of the event. Particularly, the reporting of the event might be triggered by the event itself triggering establishment, or reestablishment, of a call connection with the second radio access network node 300b.

There could be different types of performance degradations of which the wireless device 200 is configured to report events. According to a non-limiting example the performance degradation pertains to at least one radio condition, such as signal quality or signal strength, as experienced by the wireless device 200 in idle mode, being below a threshold value.

There could be different ways for the wireless device 200 to be configured in terms of how events are to be reported.

In some aspects the wireless device 200 is configured by the network in terms of how events are to be reported. Particularly, according to an embodiment the wireless device 200 is configured to perform (optional) step S102:

S102: The wireless device 200 obtains configuration information from the communications system 100, 100a, 100b of how the wireless device 200 is to report the event to the second radio access network node 300b.

As a non-limiting example, the wireless device 200 might receive such configuration information from an OSS entity 600a, 600b via a radio access network node 300a, 300b.

In some aspects the wireless device 200 is preconfigured in terms of how events are to be reported. Particularly, according to an embodiment, how to report the event is preconfigured in the wireless device 200.

Figure 3:
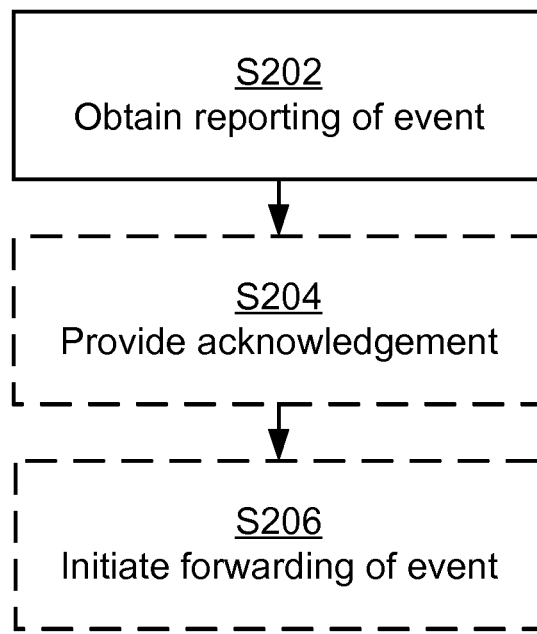

Reference is now made to FIG. 3 illustrating a method for obtaining reporting of performance degradation in a communications system 100, 100a, 100b as performed by the radio access network node 300b according to an embodiment.

As disclosed above, the wireless device 200 reports an event to the second radio access network node 300b. It is thus assumed that the wireless device 200 reports an event to the radio access network node 300b. Hence, the radio access network node 300b is configured to perform step S202:

S202: The radio access network node 300b obtains reporting of an event from a wireless device 200 in idle mode.

As disclosed above, the event has been detected by the wireless device 200 and pertains to a performance degradation of the wireless device 200 with another (first) radio access network node 300a.

As disclosed above, the radio access network node 300b and the so-called another (first) radio access network node 300a operate using mutually different radio access technologies 400a, 400b and/or serve mutually different public land mobile networks 500a, 500b.

The radio access network node 300b thus corresponds to the above referred to second radio access network node 300b, and the radio access network node 300a thus corresponds to the above referred to first radio access network node 300a.

Embodiments relating to further details of obtaining reporting of performance degradation in a communications system 100, 100a, 100b as performed by the radio access network node 300b will now be disclosed.

As disclosed above, there could be different ways for the wireless device 200 to report the event to the second radio access network node 300b. Different embodiments relating thereto will now be described in turn.

As further disclosed above, in some aspects, MDT is enabled in the second radio access network node 300b. Particularly, according to an embodiment the reporting is then obtained in a report of MDT measurements.

As further disclosed above, in some aspects, the event is reported using radio resource control signalling. Particularly, according to an embodiment the reporting is obtained in a radio resource control connection request message in a radio resource control connection procedure.

As further disclosed above, the event might have its own establishment cause. Particularly, according to an embodiment the radio resource control connection request message has a dedicated establishment cause.

As further disclosed above, there could be additional content in the radio resource control connection request message other than the event itself. Examples of such additional content have been given above.

As further disclosed above, there could be other radio resource control messages, in addition to radio resource control connection request message, that the event is reported in. Particularly, the event might be reported in a radio resource control connection reestablishment message in a radio resource control connection procedure.

As further disclosed above, when the event is reported in a radio resource control connection establishment message or reestablishment message the wireless device 200 might receive a response from the second radio access network node 300b as an acknowledgement of reception of the reported event. Particularly, according to an embodiment the radio access network node 300b is configured to perform (optional) step S204: S204: The radio access network node 300b provides an acknowledgement message to the wireless device 200 in response to having obtained the reporting. The acknowledgement message terminates the radio resource control connection in case of the request procedure.

Aspects of how the radio access network node 300b might handle the event once it has received the reporting thereof will now be disclosed.

As in the illustrative example of FIG. 1, the radio access network node 300b might be associated with one OSS 600b and the so-called another (first) radio access network node 300a might be associated with another OSS 600a. In some aspects the radio access network node 300b is instrumental for the forwarding of the event from the OSS 600b of the radio access network node 300b to the OSS 600a of the so-called other (first) radio access network node 300a. Particularly, according to an embodiment the radio access network node 300b is configured to perform (optional) step S206:

S206: The radio access network node 300b initiates forwarding of the event from the OSS 600b of the radio access network node 300b to the OSS 600a of the so-called another (first) radio access network node 300a.

There could be different ways to initiate the forwarding of the event.

In some aspects the reporting is directly to the OSS 600a of the so-called another (first) radio access network node 300a. The forwarding of the event might then be initiated directly towards the OSS 600a of the so-called another (first) radio access network node 300a.

In some aspects the reporting is to a network server 700 operatively connected to both OSSs 600a, 600b. The forwarding of the event might then be initiated indirectly, via the network server 700, towards the OSS 600a of the so-called another (first) radio access network node 300a.

In some aspects the forwarding of the event is initiated directly towards the OSS 600a of the so-called another (first) radio access network node 300a only when an identity of this OSS 600a is known. Particularly, the reporting of the event might comprise a cell identity of the so-called another (first) radio access network node 300a, and the forwarding of the event is initiated directly towards the OSS 600a of this so-called another (first) radio access network node 300a (only) when an identity of the OSS 600a of this so-called another (first) radio access network node 300a is derivable from the cell identity.

Three particular embodiments for reporting performance degradation in a communications system 100, 100a, 100b and for obtaining reporting of performance degradation in a communications system 100, 100a, 100b based on at least some of the above disclosed aspects, embodiments, and examples will now be disclosed.

A first particular embodiment pertains to a scenario where MDT is enabled in the second radio access network node 300b.

In this respect, according to the current 3GPP technical specification 37.320 "Universal Terrestrial Radio Access (UTRA) and Evolved Universal Terrestrial Radio Access (E-UTRA); Radio measurement collection for Minimization of Drive Tests (MDT); Overall description; Stage 2", release v14.0.0, the wireless device 200 will not indicate the availability of MDT measurements in another RAT or in a PLMN that is not in the MDT PLMN list, see Section 5.1.1.3.1 (Availability Indicator). In contrast thereto, according to some of the herein disclosed embodiments the wireless device 200 is enabled to report MDT logged reports to a cell belonging to another RAT. This does not require any changes of MDT in existing procedures except the requirement that the target RAT (i.e., the RAT 400b of the second radio access network node 300b) has enabled MDT.

According to this first particular embodiment the wireless device 200 might then be configured to perform the following steps:

Step 1: The wireless device 200 performs MDT and/or failure logging for events in a first RAT 400a or PLMN 500a, or determines a need for reporting for one or more events in a first RAT 400a or PLMN 500a, as in step S104.

Step 2: The wireless device 200 determining whether the reporting of the event is to be via a second RAT 400b or PLMN 500b, e.g., when reporting via the first RAT 400a or PLMN 500a is not possible or less preferable or less reliable or when the reporting via the second RAT 400b or PLMN 500b has been explicitly configured in the wireless device 200, for example as in step S106 that MDT is enabled at the second radio access network node 300b of the second RAT 400b or PLMN 500b.

Step 3: The wireless device 200, upon having determined that the reporting is to be made via the second RAT 400b or PLMN 500b, reports the event to the second radio access network node 300b, as in step S108.

In one example, the wireless device 200 could be under network coverage of the second RAT 400b or PLMN 500b even when performing Step 1. In another example, the wireless device 200 may change to being under network coverage of the second RAT 400b or PLMN 500b after performing Step 1 and thus be under network coverage of only the first RAT 400a or PLMN 500a, and, while changing from the first RAT 400a or PLMN 500a to the second RAT 400b or PLMN 500b keep the event in its local storage.

A second particular embodiment pertains to a scenario where the event is reported using radio resource control signalling.

Two scenarios will be disclosed next. In a first scenario the first radio access network node 300a and the second radio access network node 300b belong to two different RATs 400a, 400b under the same PLMN 500a, 500b. In a second scenario the first radio access network node 300a and the second radio access network node 300b belong to two different PLMNs 500a, 500b, regardless if they belong to one and the same RAT 400a, 400b or not.

Details of the first scenario will now be disclosed.

One of two procedures is used, depending on the type of the performance degradation encountered by the wireless device 200 with the first radio access network node 300a. The first procedure pertains only to reporting of the performance degradation to the second radio access network node 300b. The second procedure pertains to reporting of the performance degradation to the second radio access network node 300b and reestablishment of a call with the second radio access network node 300b.

Details of the first procedure will now be disclosed.

When the wireless device 200 in idle mode encounters a performance degradation with the first radio access network node 300a, e.g. detecting very low radio received level (e.g. very low RSRP) it, as a consequence, tries first to report in real time an event of that performance degradation to the first radio access network node 300b. It is assumed that such reporting fails. In this first procedure, the wireless device 200 first selects another radio access network node 300b belonging to the same PLMN. The wireless device 200 then reports the event using a modified rrcConnectionRequest message which has two modifications comparted to the existing rrcConnectionRequest message, as defined in the current 3GPP technical specification 36.331 "Evolved Universal Terrestrial Radio Access (E-UTRA); Radio Resource Control (RRC); Protocol specification", release v15.1.0.

The first modification pertains to the rrcConnectionRequest message having a dedicated RRC establishment cause pertaining to real time reporting of performance degradation.

In addition to the dedicated establishment cause identities related to the first radio access network node 300a, such as its RAT 400a and its PLMN 500a, will be also reported by the wireless device 200 to the second radio access network node 300b in the modified rrcConnectionRequest message.

The first modification pertains to how the second radio access network node 300b responds to the wireless device 200 upon having obtained the modified rrcConnectionRequest message. In existing standards the rrcConnectionRequest message is used by the wireless device 200 to establish its call setup on the network or to report its location, e.g. by triggering a Tracking Area Update procedure. According to the first procedure the modified rrcConnectionRequest message is used only for reporting of performance degradation and hence when the second radio access network node 300b obtains the modified rrcConnectionRequest message with the above-disclosed dedicated establishment cause it will respond to the wireless device 200 with an rrcConnectionReject message which terminates the RRC procedure.

Figure 4:
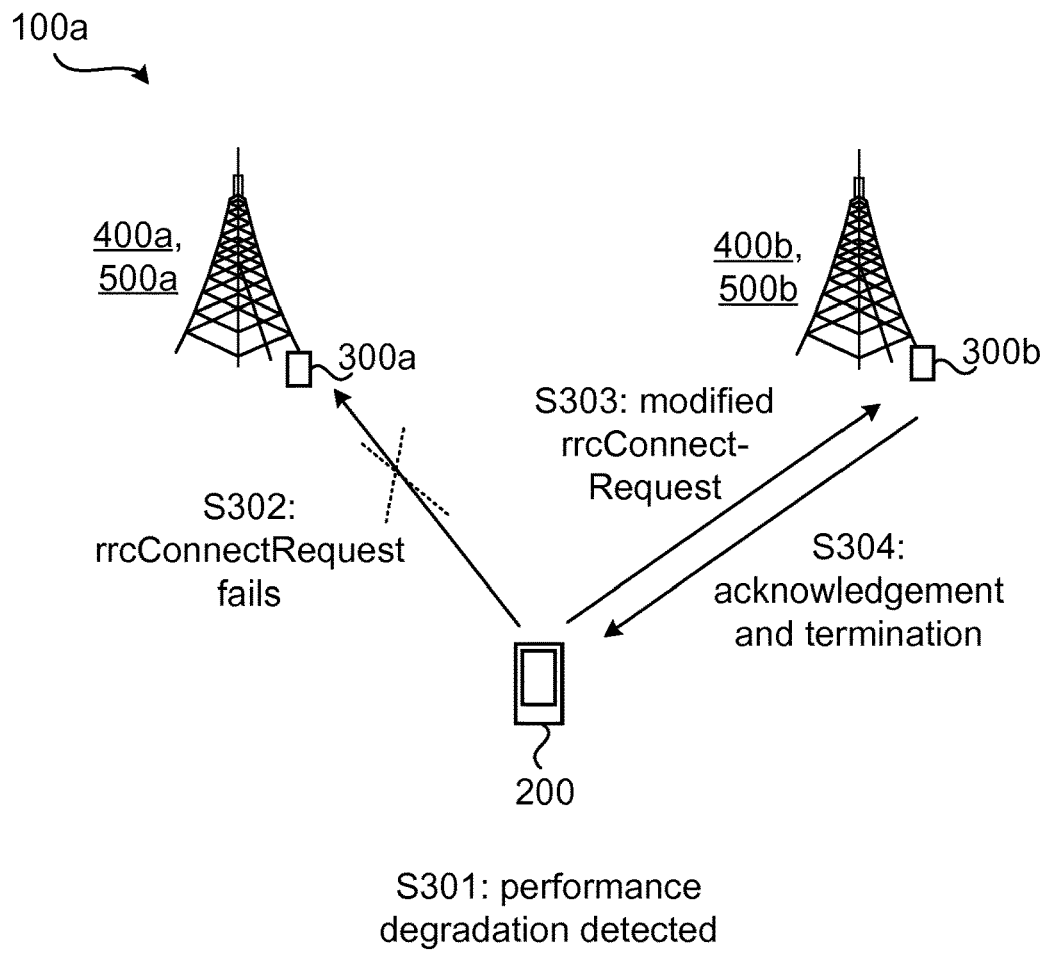

Reference is here made to FIG. 4 schematically illustrating a communications system 100a and method according to the second particular embodiment.

S301: The wireless device 200 detects a performance degradation with the first radio access network node 300a.

S302: The wireless device 200 tries to report the performance degradation to the first radio access network node 300a, but the delivery of the rrcConnectionRequest message fails.

S303: The wireless device 200 detects the performance degradation as an event to the second radio access network node 300b in a modified rrcConnectionRequest message.

S304: The second radio access network node 300b acknowledges receipt of the modified rrcConnectionRequest message by responding with an rrcConnectionReject message to the wireless device 200. This terminates the RRC procedure.

Details of the second procedure will now be disclosed.

When the call (or communication) of wireless device 200 that is using any existing establishment cause, e.g. establishment cause equal to mo-data, drops on the first radio access network node 300a, then based on existing standards for call reestablishment the wireless device 200 tries to reestablish the call, by sending an rrcConnectionReestablishmentRequest message, initially to the first radio access network node 300a and in case that reestablishment with the first radio access network node 300a fails, the wireless device 200 tries to reestablish the call on a neighboring cell, e.g. a cell that is controlled by the second radio access network node 300b. The wireless device 200 selects to use the same establishment cause (equal to mo-data) when performing the call setup with the second radio access network node 300b. In addition, the wireless device 200 flags to the second radio access network node 300b, e.g. in an rrcConnectionSetupComplete message or in an rrcConnectionReestablishmentComplete message that the wireless device 200 has experienced a connection establishment failure with the first radio access network node 300a via connEstFailInfoAvailable message. The second radio access network node 300b might respond to the wireless device 200 with a UEInformationRequest messages. The wireless device 200 might then reply with a UEInformationResponse message comprising a connEstFailReport. The connEstFailReport might comprise the event of the performance degradation as well as identity of the first radio access network node 300a and probable cause of the call setup failures of the wireless device 200. Further, the connEstFailReport might comprise other information, e.g. information of the location of the wireless device 200 when detecting the performance degradation. As noted above, this works only when the first radio access network node 300a and the second radio access network node 300b belong to the same PLMN. Hence, the VarConnEstFailReport described in above reference 3GPP technical specification 36.331 is modified to allow the wireless device to report events of performance degradation of the first radio access network node 300a to the second radio access network node 300b, where the first radio access network node 300a and the second radio access network node 300b belong to different PLMNs 500a, 500b.

In the present disclosure, call reestablishment refers to two different situations: The first situation relates to when the wireless device 200 performing a call with a cell of the first radio access node 300a experiences a dropped call and has to reestablish its call with a cell of the second radio access node 300b via an rrcConnectionReestablishmentRequest message as described above. The second situation relates to when the wireless device 200 is trying to perform a call setup, with any establishment cause, e.g. mo-data, with the first radio access node 300a but fails, and then trying to establish the call with a cell of the second radio access node 300b, by sending a modified rrcConnectionRequest message with establishment cause mo-data, but containing additional information regarding the call failure with the first radio access node 300a.

Details of the second scenario will now be disclosed.

In might be assumed that the wireless device 200 has a roaming agreement with the PLMN 500b of the second radio access network node 300b. The wireless device 200 could then transmit an rrcConnectionReestablishmentRequest message or rrcConnectionRequest message to the second radio access network node 300b of a different PLMN 500b than the PLMN 500a of the first radio access network node 300b. This is also applicable when the wireless device 200 is performing an emergency call because in such a case the wireless device 200 could trigger the call on any PLMN, even though the wireless device 200 is not registered to that PLMN. Any of the above-disclosed first procedure and second procedure of the first scenario then apply. Cases where there is no such roaming agreement are out of the scope of the present disclosure.

A third particular embodiment pertains to forwarding of the event

Figure 5:
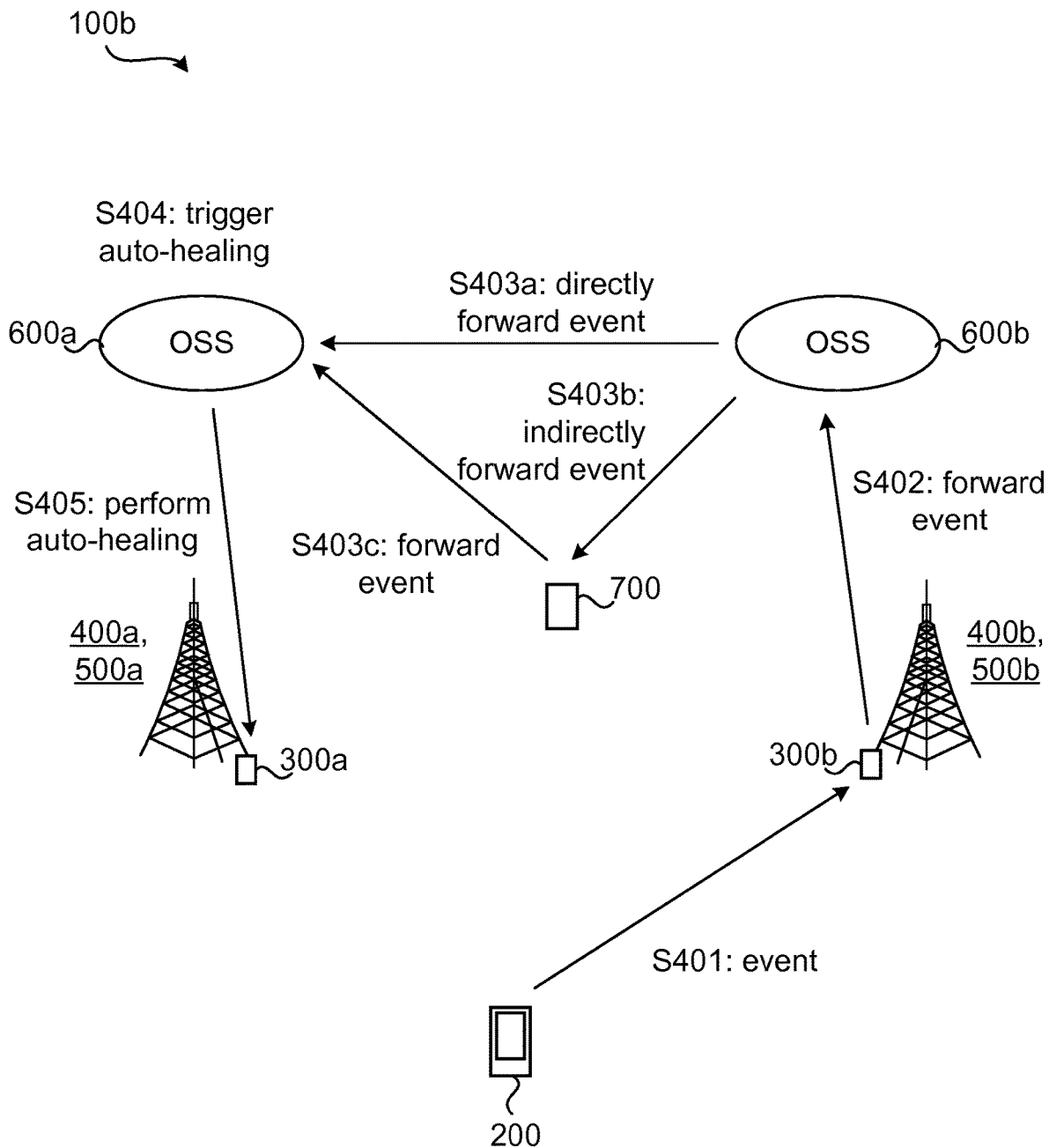

Reference is here made to FIG. 5 schematically illustrating a communications system 100b and method according to the third particular embodiment.

S401: The second radio access network node 300b obtains reporting of the event from the wireless device 200.

S402: The second radio access network node 300b forwards the event to the OSS 600b of the second radio access network node 300b and initiates forwarding of the event to the OSS 600a of the first radio access network node 300a. The OSS 600b reads the cell identity and RAT identity of the first radio access network node 300a as provided in the reporting of the event.

S403a: The OSS 600b, when having access to the identity of the OSS 600a of the first radio access network node 300a, forwards the event directly to that OSS 600a.

Step S403a could typically be performed when OSS 600a and OSS 600b belong to one and the same PLMN 500a, 500b.

S403b: The OSS 600b, when not having access to the identity of the OSS 600a of the first radio access network node 300a, forwards the event indirectly to that OSS 600a via the network server 700 operatively connected to both OSSs 600a, 600b.

S403c: The network server 700 forwards the event to the OSS 600a of the first radio access network node 300a upon having input the cell identity and RAT identity of the first radio access network node 300a to a database and retrieving the identity of the OSS 600a of the first radio access network node 300a from the database.

Steps S403b and S403c could typically be performed when OSS 600a and OSS 600b belong to two different PLMNs 500a, 500b.

S404: The OSS 600a, upon having received the event, triggers auto-healing.

S405: The OSS 600a instructs the first radio access network node 400a to perform auto-healing.

With regards to steps S404 and S405, what type of auto-healing to perform depends on what type of performance degradation the event pertains to. Auto-healing algorithms are as such known by the skilled person and further description thereof is therefore omitted.

Figure 6:
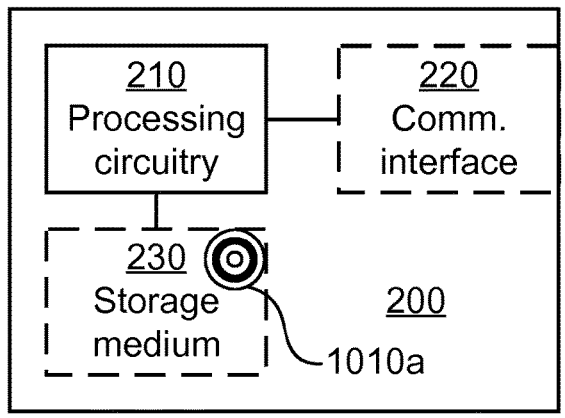
FIG. 6 is a schematic diagram showing functional units of a wireless device according to an embodiment.

FIG. 6 schematically illustrates, in terms of a number of functional units, the components of a wireless device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device 200 to perform a set of operations, or steps, as disclosed above. For example, the storage medium 230 may store the set of operations, and the processing circuitry 210 could be configured to retrieve the set of operations from the storage medium 230 to cause the wireless device 200 to perform the set of operations. The set of operations could be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The wireless device 200 may further comprise a communications interface 220 for communications with other entities, nodes, functions, and devices of the communications systems 100, 100a, 100b. As such the communications interface 220 may comprise one or more transmitters and receivers, comprising analogue and digital components.

The processing circuitry 210 controls the general operation of the wireless device 200 e.g. by sending data and control signals to the communications interface 220 and the storage medium 230, by receiving data and reports from the communications interface 220, and by retrieving data and instructions from the storage medium 230. Other components, as well as the related functionality, of the wireless device 200 are omitted in order not to obscure the concepts presented herein.

Figure 7:
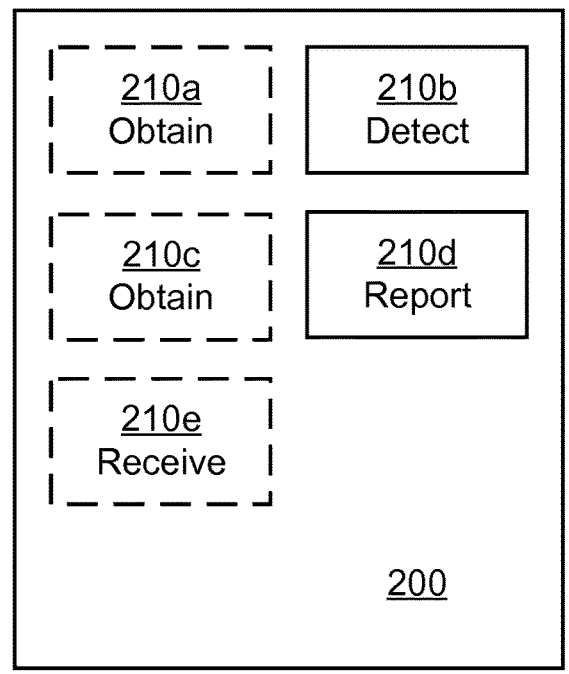
FIG. 7 is a schematic diagram showing functional modules of a wireless device according to an embodiment.

FIG. 7 schematically illustrates, in terms of a number of functional modules, the components of a wireless device 200 according to an embodiment. The wireless device 200 of FIG. 7 comprises a number of functional modules; a detect module 210b configured to perform step S104, and a report module 2102 configured to perform step S108. The wireless device 200 of FIG. 7 may further comprise a number of optional functional modules, such as any of an obtain module 210a configured to perform step S102, an obtain module 210c configured to perform step S106, and a receive module 210e configured to perform step S10. In general terms, each functional module 210a-210e could be implemented in hardware or in software. Preferably, one or more or all functional modules 210a-210e could be implemented by the processing circuitry 210, possibly in cooperation with the communications interface 220 and/or the storage medium 230. The processing circuitry 210 may thus be arranged to from the storage medium 230 fetch instructions as provided by a functional module 210a-210e and to execute these instructions, thereby performing any steps of the wireless device 200 as disclosed herein.

Examples of wireless devices 200 have been given above.

Figure 8:
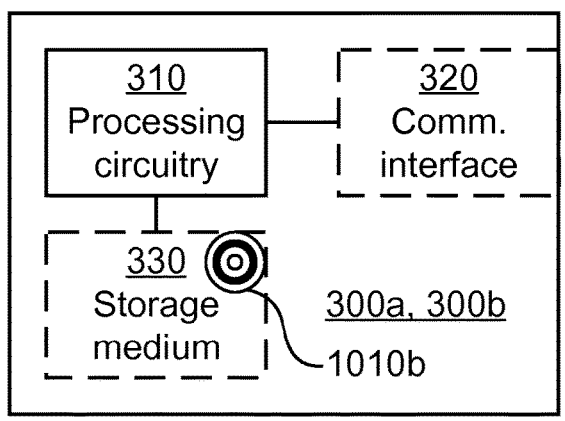
FIG. 8 is a schematic diagram showing functional units of a radio access network node according to an embodiment.

FIG. 8 schematically illustrates, in terms of a number of functional units, the components of a radio access network node 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010b (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the radio access network node 300b to perform a set of operations, or steps, as disclosed above. For example, the storage medium 330 may store the set of operations, and the processing circuitry 310 could be configured to retrieve the set of operations from the storage medium 330 to cause the radio access network node 300b to perform the set of operations. The set of operations could be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The radio access network node 300b may further comprise a communications interface 320 for communications with other entities, nodes, functions, and devices of the communications systems 100, 100a, 100b. As such the communications interface 320 may comprise one or more transmitters and receivers, comprising analogue and digital components.

The processing circuitry 310 controls the general operation of the radio access network node 300b e.g. by sending data and control signals to the communications interface 320 and the storage medium 330, by receiving data and reports from the communications interface 320, and by retrieving data and instructions from the storage medium 330. Other components, as well as the related functionality, of the radio access network node 300b are omitted in order not to obscure the concepts presented herein.

Figure 9:
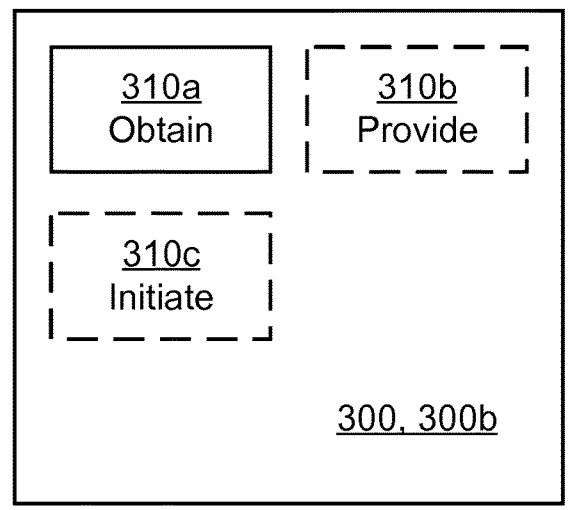
FIG. 9 is a schematic diagram showing functional modules of a radio access network node according to an embodiment.

FIG. 9 schematically illustrates, in terms of a number of functional modules, the components of a radio access network node 300b according to an embodiment. The radio access network node 300b of FIG. 9 comprises an obtain module 310a configured to perform step S202. The radio access network node 300b of FIG. 9 may further comprise a number of optional functional modules, such as any of a provide module 310b configured to perform step S204, and an initiate module 310c configured to perform step S206. In general terms, each functional module 310a-310c could be implemented in hardware or in software. Preferably, one or more or all functional modules 310a-310c could be implemented by the processing circuitry 310, possibly in cooperation with the communications interface 320 and/or the storage medium 330. The processing circuitry 310 may thus be arranged to from the storage medium 330 fetch instructions as provided by a functional module 310a-310c and to execute these instructions, thereby performing any steps of the radio access network node 300b as disclosed herein.

Examples of radio access network nodes 300b have been given above.

The radio access network node 300b could be provided as a standalone device or as a part of at least one further device. For example, the radio access network node 300b could be provided in a node of the radio access network. Alternatively, functionality of the radio access network node 300b could be distributed between at least two devices, or nodes.

Thus, a first portion of the instructions performed by the radio access network node 300b could be executed in a first device, and a second portion of the of the instructions performed by the radio access network node 300b could be executed in a second device; the herein disclosed embodiments are not limited to any particular number of devices on which the instructions performed by the radio access network node 300b could be executed. Hence, the methods according to the herein disclosed embodiments are suitable to be performed by a radio access network node 300b residing in a cloud computational environment. Therefore, although a single processing circuitry 210, 310 is illustrated in FIG. 8 the processing circuitry 310 could be distributed among a plurality of devices, or nodes. The same applies to the functional modules 310a-310c of FIG. 9 and the computer program 1020b of FIG. 10.

Figure 10:
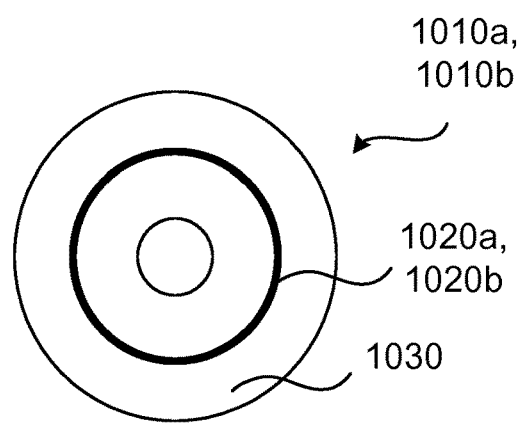
FIG. 10 shows one example of a computer program product comprising computer readable means according to an embodiment.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the wireless device 200 as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the radio access network node 300b as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A wireless device for reporting performance degradation in a communications system, the wireless device comprising processing circuitry, the processing circuitry being configured to cause the wireless device to:
   detect occurrence of performance degradation with a first radio access network node; and
   report, when performing an emergency call, the performance degradation as an event to a second radio access network node that serves a public land mobile network to which the wireless device is not registered,
   wherein the first radio access network node and the second radio access network node serve mutually different public land mobile networks.

2. The wireless device according to claim 1, wherein the event is reported in a report of minimization of drive test, MDT, measurements.

3. The wireless device according to claim 2, the processing circuitry being configured to cause the wireless device to, in idle mode, delay reporting of the event until a call connection is established with the second radio access network node.

4. The wireless device according to claim 1, wherein the event is reported in a radio resource control connection request message in a radio resource control connection procedure.

5. The wireless device according to claim 4, wherein the radio resource control connection request message has a dedicated establishment cause pertaining to real time reporting of performance degradation.

6. The wireless device according to claim 4, wherein the radio resource control connection request message comprises at least one of: a cell identity of the first radio access network node, an identity of a radio access technology of the first radio access network node, and an identity of a public land mobile network of the first radio access network node.

7. The wireless device according to claim 4, the processing circuitry being further configured to cause the wireless device to:
receive an acknowledgement message from the second radio access network node in response to having reported the event, and wherein the acknowledgement message terminates the radio resource control connection request procedure.

8. The wireless device according to claim 5, wherein the reporting of the event is triggered by the event itself triggering establishment of a call connection with the second radio access network node.

9. The wireless device according to claim 1, wherein the event is reported in a radio resource control connection reestablishment message in a radio resource control connection procedure.

10. The wireless device according to claim 1, wherein the performance degradation pertains to at least one radio condition, as experienced by the wireless device in idle mode, being below a threshold value.

11. The wireless device of claim 1, wherein the processing circuitry is configured to cause the wireless device to detect occurrence of the performance degradation with the first radio access network node while the wireless device is in idle mode.

12. A radio access network node for obtaining reporting of performance degradation in a communications system, the radio access network node comprising processing circuitry, the processing circuitry being configured to cause the radio access network node to:
obtain reporting of an event from a wireless device when the wireless device is performing an emergency call, wherein the radio access node serves a public land mobile network to which the wireless device is not registered;
wherein the event has been detected by the wireless device and pertains to a performance degradation of the wireless device with another radio access network node, and
wherein the radio access network node and said another radio access network node serve mutually different public land mobile networks.

13. The radio access network node according to claim 12, wherein the reporting is obtained in a report of minimization of drive test, MDT, measurements.

14. The radio access network node according to claim 12, wherein the reporting is obtained in a radio resource control connection request message in a radio resource control connection procedure.

15. The radio access network node according to claim 14, wherein the radio resource control connection request message has a dedicated establishment cause pertaining to real time reporting of performance degradation.

16. The radio access network node according to claim 14, wherein the radio resource control connection request message comprises at least one of: a cell identity of said another radio access network node, an identity of a radio access technology of said another radio access network node, and an identity of a public land mobile network of said another radio access network node.

17. The radio access network node according to claim 14, the processing circuitry being further configured to cause the radio access network node to:
provide an acknowledgement message to the wireless device in response to having obtained the reporting, and wherein the acknowledgement message terminates the radio resource control connection request procedure.

18. The radio access network node according to claim 12, wherein the event is reported in a radio resource control connection reestablishment message in a radio resource control connection procedure.

19. The radio access network node according to claim 12, wherein the radio access network node is associated with an Operations Support System, OSS, and wherein said another radio access network node is associated with another OSS, the processing circuitry being configured to cause the radio access network node to:
initiate forwarding of the event from the OSS of the radio access network node to the OSS of said another radio access network node.

20. The radio access network node according to claim 19, wherein the reporting of the event comprises a cell identity of said another radio access network node, and wherein the forwarding of the event is initiated directly towards the OSS of said another radio access network node when an identity of the OSS of said another radio access network node is derivable from the cell identity.

21. The radio access network node of claim 12, wherein the event reported pertains to a performance degradation of the wireless device with another radio access network node while the wireless device was in idle mode.

22. A method for reporting performance degradation in a communications system, the method being performed by a wireless device, the method comprising:
detecting occurrence of performance degradation with a first radio access network node; and
reporting, when performing an emergency call, the performance degradation as an event to a second radio access network node that serves a public land mobile network to which the wireless device is not registered,
wherein the first radio access network node and the second radio access network node serve mutually different public land mobile networks.

23. The method of claim 22, wherein said detecting comprises detecting occurrence of the performance degradation with the first radio access network node while the wireless device is in idle mode.

24. A method for obtaining reporting of performance degradation in a communications system, the method being performed by a radio access network node, the method comprising:
obtaining reporting of an event from a wireless device when the wireless device is performing an emergency call, wherein the radio access node serves a public land mobile network to which the wireless device is not registered;
wherein the event has been detected by the wireless device and pertains to a performance degradation of the wireless device with another radio access network node, and
wherein the radio access network node and said another radio access network node serve mutually different public land mobile networks.

25. The method of claim 24, wherein the event reported pertains to a performance degradation of the wireless device with another radio access network node while the wireless device was in idle mode.

* * * * *